US006751809B1

(12) United States Patent
Cooper et al.

(10) Patent No.: US 6,751,809 B1
(45) Date of Patent: Jun. 22, 2004

(54) HELMET RESTRAINT SYSTEM

(75) Inventors: John Cooper, Oxford, MI (US); Richard E. Costello, Clinton Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/370,021

(22) Filed: Feb. 19, 2003

(51) Int. Cl.$^7$ .............................................. A42B 7/00
(52) U.S. Cl. .............................................. 2/421; 2/425
(58) Field of Search ........................... 2/421, 468, 425, 2/416, 415, 411, 6.1, 6.2; 244/122 AG; 280/290, 801.1; 297/464

(56) References Cited

U.S. PATENT DOCUMENTS

| 4,477,041 A | * | 10/1984 | Dunne | 244/122 AG |
|---|---|---|---|---|
| 4,923,147 A | * | 5/1990 | Adams et al. | 244/122 AG |
| 4,967,985 A | * | 11/1990 | Deakin | 244/122 AG |
| 5,272,770 A | * | 12/1993 | Allen et al. | 2/421 |
| 6,009,566 A | * | 1/2000 | Hubbard | 2/468 |
| 2001/0002087 A1 | * | 5/2001 | Townsend | 280/801.1 |

FOREIGN PATENT DOCUMENTS

JP          08072669 A    *  3/1996   ........... B60R/22/12

* cited by examiner

*Primary Examiner*—Rodney M. Lindsey
(74) *Attorney, Agent, or Firm*—Markell Seitzman

(57) ABSTRACT

An occupant helmet protection system usable with an occupant helmet and a seat belt system, the seat belt system of the type including at least a first and a second shoulder belt, each of which when worn is positioned to lie across a respective shoulder of an occupant, the helmet occupant protection system including an energy absorbing, flexible tether having a first end operatively connected to the helmet in alignment with an effective center of gravity of the combined helmet and the occupant's head, the tether including a second end connected to a tether anchor point; a frame member loosely supported about the shoulders of the occupant and including a center or tower portion, the center or tower portion having a tether guide means for changing the direction of the tether and providing a low friction surface for the tether, the tether guide means located in alignment with or slightly above a first plane, which passes through the effective center of gravity of the head-helmet combination and the tether-helmet anchor point, the tether passing about and not connected to the frame member.

21 Claims, 6 Drawing Sheets

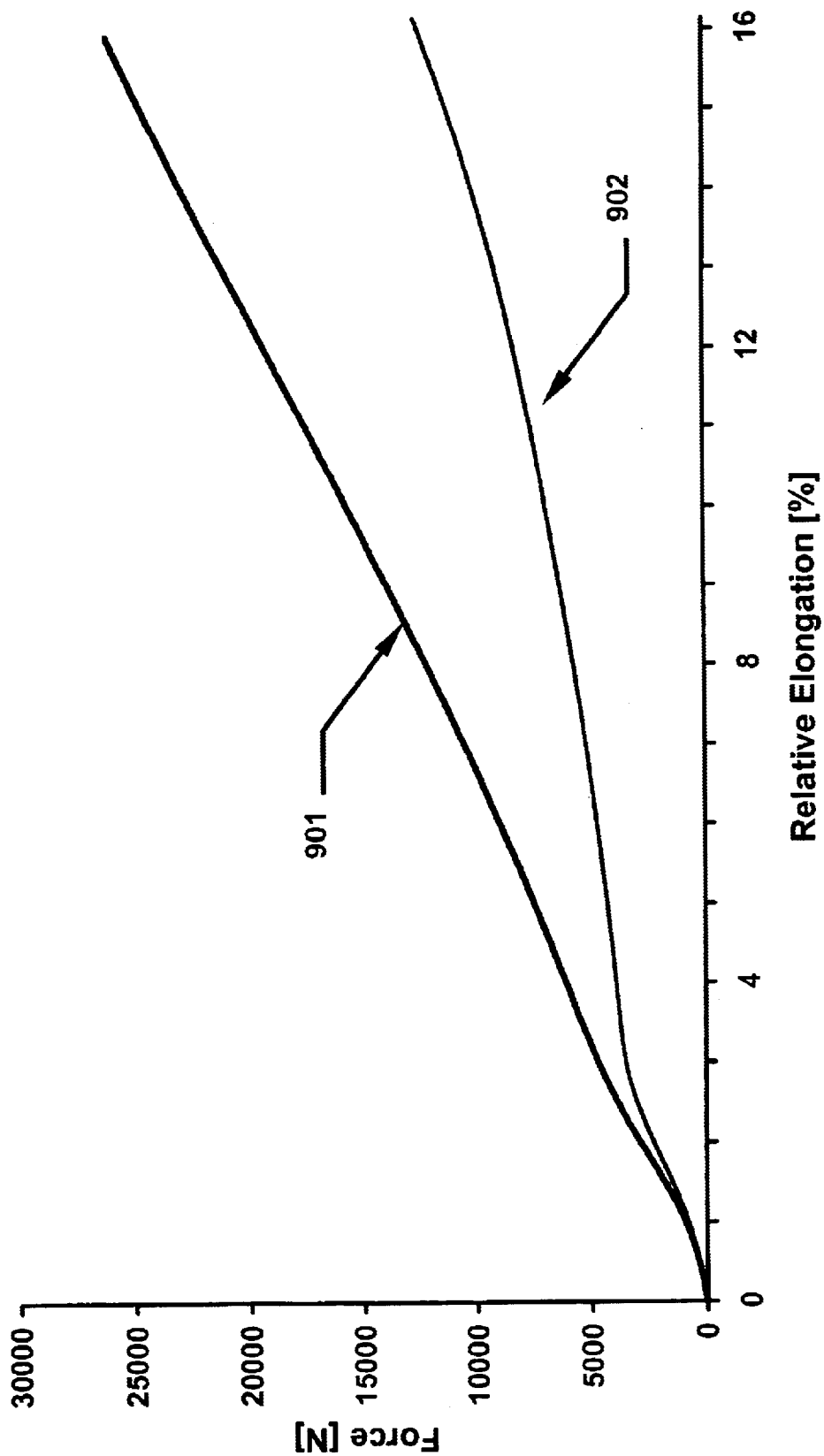

HELMET RESTRAINT SYSTEM

BACKGROUND AND SUMMARY OF THE INVENTION

The present invention relates to a neck and head protection device for use by drivers of vehicles subject to high deceleration or crash forces.

FIG. 1 schematically represents a five-point seat belt system 20 having two shoulder belts 22a and 22b, two lap belts 24a and 24b and a crotch belt or strap 26. A latching mechanism(s) 30 comprises at least one buckle 32 and a plurality of tongues 34a, 34b. The arrangement of the seat belt, tongues and buckle is designed to permit a quick release and permit the driver to easily exit the vehicle.

When a high-performance vehicle such as a race car is in an accident or otherwise decelerates, the vehicle is subjected to extremely high g forces. Additionally, if the driver's head is not restrained, these forces are amplified dramatically as the head, increased in mass by even a modestly sized helmet, moves uncontrollably.

Various solutions have been proposed to limit or otherwise control the motion of the head and neck of the driver. U.S. Pat. No. 4,638,510 proposes the use of a yoke held in place by the downward forces of the shoulder belt (on the driver's shoulders). Various tethers are anchored to a rear portion of the yoke and extend to connection points on the helmet. These connection points are preferably located in a plane that includes the head-helmet center of gravity. One deficiency of this type of system is the side-to-side rotary motion of the driver's head, during normal driving situations, is significantly limited. Another deficiency of this type of system is its difficult removal in an emergency and restriction of driver egress from a damaged vehicle.

FIGS. 2 and 3 illustrate an alternate, prior art proposal in which the helmet restraint system comprises a bar 400, which rests on the occupant's back, and is received under each of the respective shoulder belts 22a and 22b and held in place by the belts. A plurality of tethers or straps 402 and 404 extend laterally across the rear of the helmet and are connected to a center strap or tether 406. End 408a of tether 406 is looped about the centers of both tethers/straps 402 and 404. The other end 408b of tether or strap 406 is looped about the bar 400. As can be seen in both FIGS. 2 and 3, the tethers 402–406 are all situated substantially below the effective center of gravity of the head-helmet. Consequently during an accident, the device fails to limit forward motion of the head relative to the restrained torso, thereby leading to large neck flexion moments and tensile forces. In addition, it has been proposed that at least one of the tethers such as tether 406 be made of a yieldable material to lessen the impact force on the driver's head.

It is an object of the present invention to provide an improvement to crash safety.

It is a further object of the present invention to provide a helmet restraint system that reduces spine and neck injuries while not restricting occupant egress from a crashed or damaged vehicle.

Accordingly the invention comprises: an occupant helmet protection system usable with an occupant helmet and a seat belt system, the seat belt system of the type including at least a first and a second shoulder belt, each of which when worn is positioned to lie across a respective shoulder of an occupant, the helmet occupant protection system comprising: an energy absorbing, flexible tether having a first end operatively connected to the helmet in alignment with an effective center of gravity of the combined helmet and occupant's head, the tether including a second end connected to a tether anchor point; a frame member loosely supported about the shoulders of the occupant and including a center or tower portion, the center or tower portion having a tether guide means for changing the direction of the tether and to provide a low friction surface for the tether, the tether guide means located in alignment with or slightly above a horizontal first plane, which passes through the effective center of gravity of the head-helmet combination and the tether-helmet anchor point, the tether passing about and not connected to the frame member.

Many other objects and purposes of the invention will be clear from the following detailed description of the drawings.

BRIEF DESCRIPTION OF THE DRAWINGS

FIG. 9 graphically shows the relative elongation for a common type of seat belt webbing compared to the relative elongation for a variable elongation seat belt webbing.

DETAILED DESCRIPTION OF THE DRAWINGS

Figure 4:
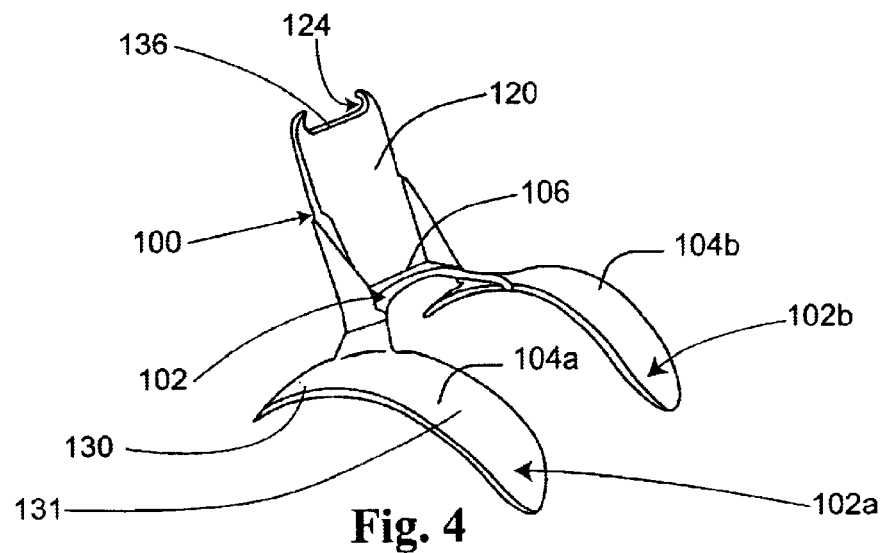
FIGS. 4, 5 and 6 illustrate an isometric, rear and front view of a yoke or frame of the present invention.
Figure 5:
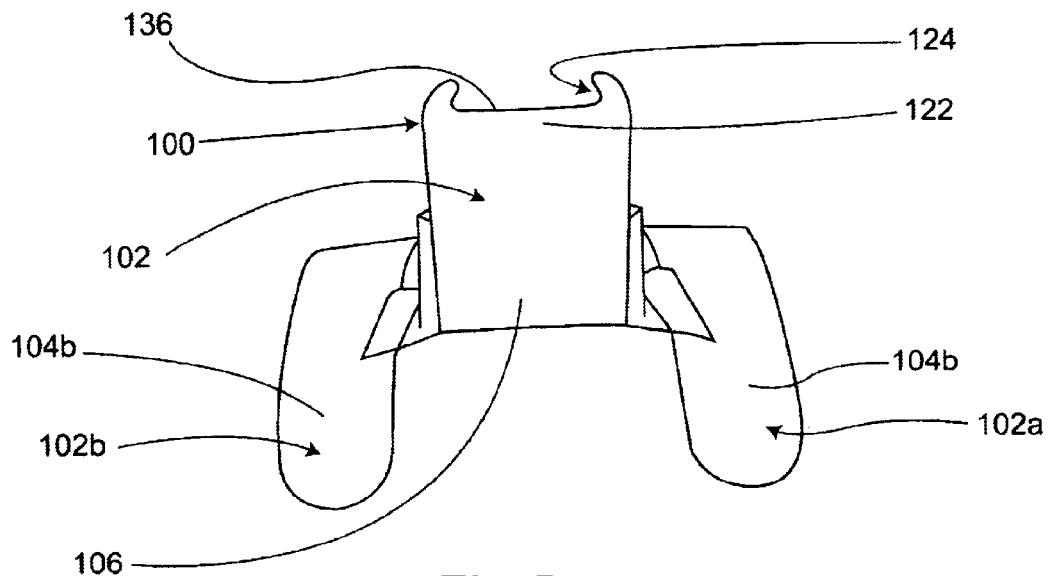
Figure 6:
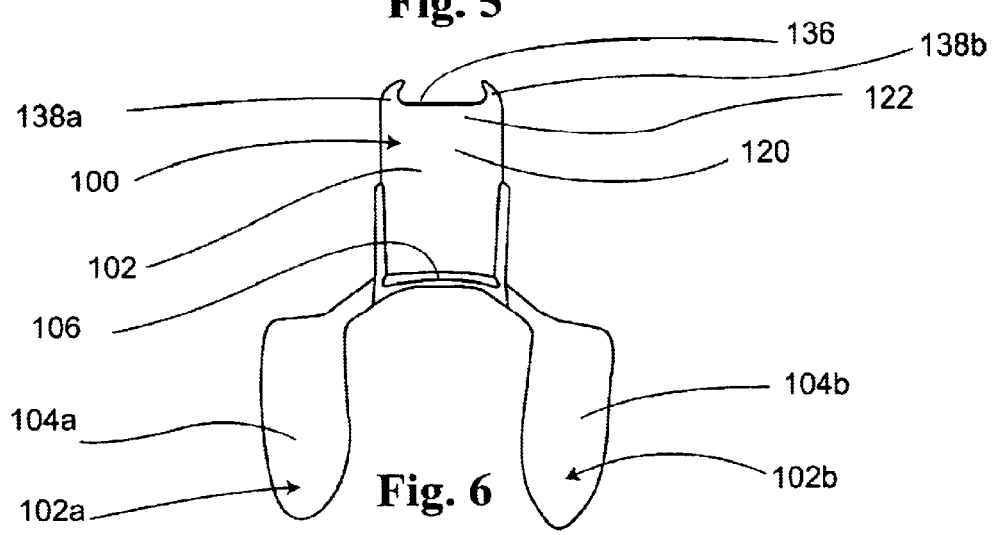
Figure 7:
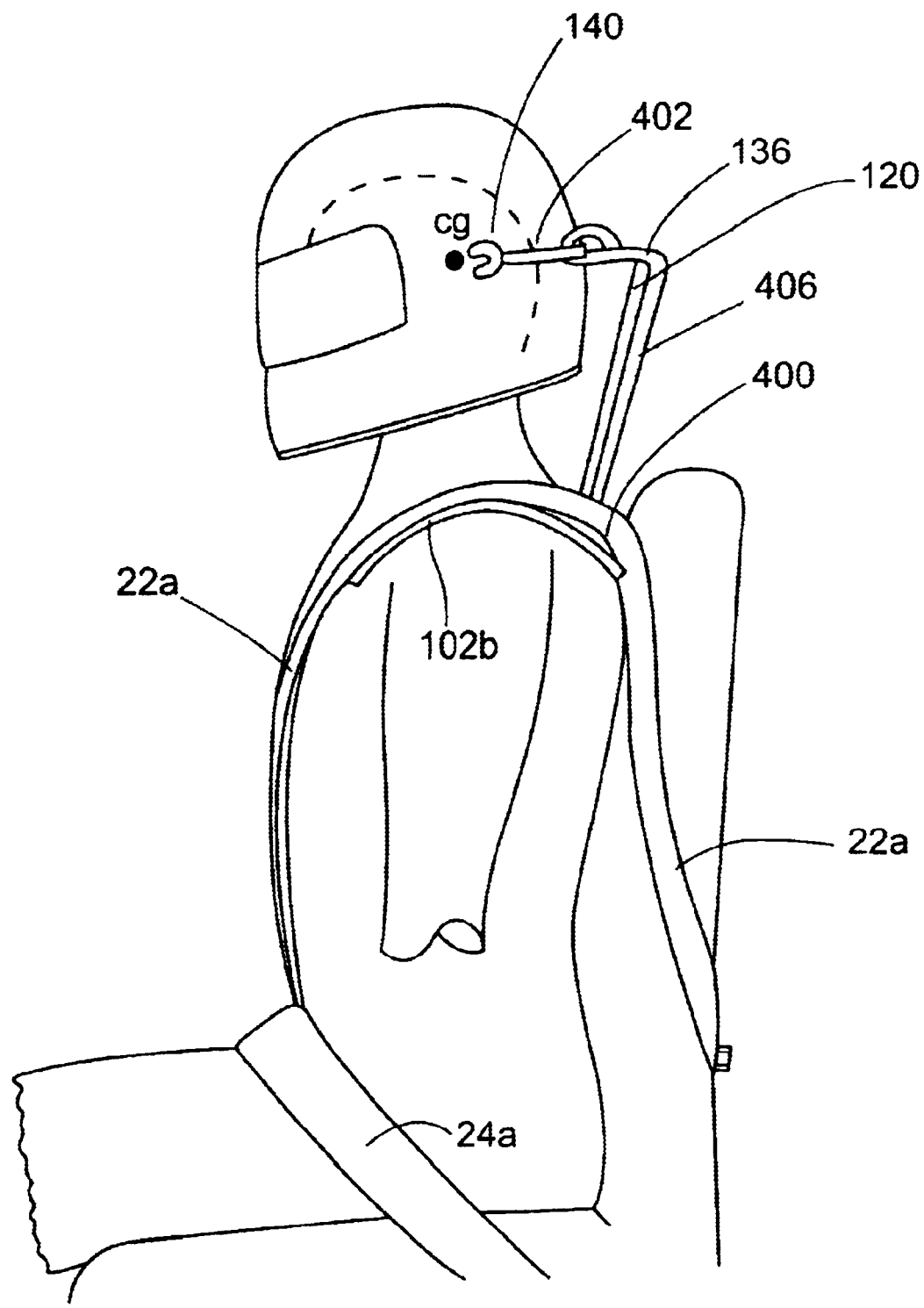
FIG. 7 is a side view of the present invention.
Figure 8:
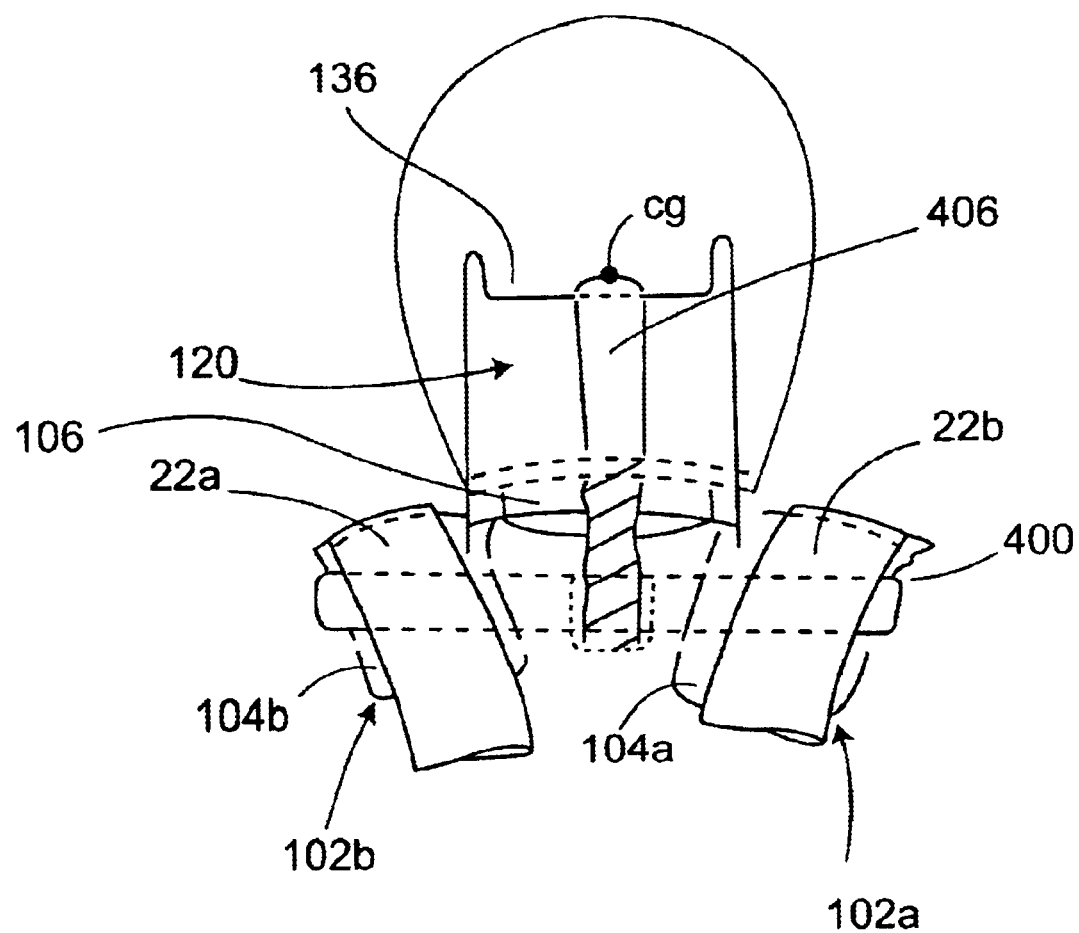
FIG. 8 is a rear view showing many of the major components of the present invention.

Reference is made to FIGS. 4 and 5, which illustrate a yoke or support frame 100 used in the preferred embodiment of the invention. The yoke 100 comprises a metal, graphite or composite (such as carbon fibre or reinforced resin) frame 102 having first and second side supports or wings 102a and 102b. As can be seen in FIG. 7, these side supports or wings are designed to be placed upon the driver's shoulder (on top of his or her uniform) with a respective shoulder belt 22a and 22b received upon a respective top surface 104a and 104b of each side support 102a and b.

The frame 102 additionally includes a rear collar, connector, cross-piece or connecting piece 106, which spans the space between the shoulder supports 102a and b. As can be seen, the cross piece 106 is elevated above a line or contour connecting the side supports 102a and b to prevent interference with the driver's upper spine. Extending upwardly from the cross piece 106 is a support or tower 120. Positioned at or near the top 122 of the support 120 is a web or tether guide 124, which comprises a slot 136 (with a flat support surface) with opposing sides or flanges 138a and 138b. The tether 406 can pivot laterally about web guide 136 allowing relatively uninhibited lateral rotation of the driver's head; therefore, this construction beneficially allows the driver to rotate his head from side-to-side. In another embodiment, the web guide includes an arcuate support surface 139 (see FIG. 6A), which smoothly extends from the web guide 124 and is positioned rearward of the support or tower 120. This curved guide 139 assists in more uniformly distributing reaction forces between the web guide 124 and the tether 406.

Each of the side supports 102a and b includes a rear portion 130 and a front portion 131, which respectively extend rearward or forward of the intersection of the tower 120 with each shoulder support 102a and 102b.

Figure 1:
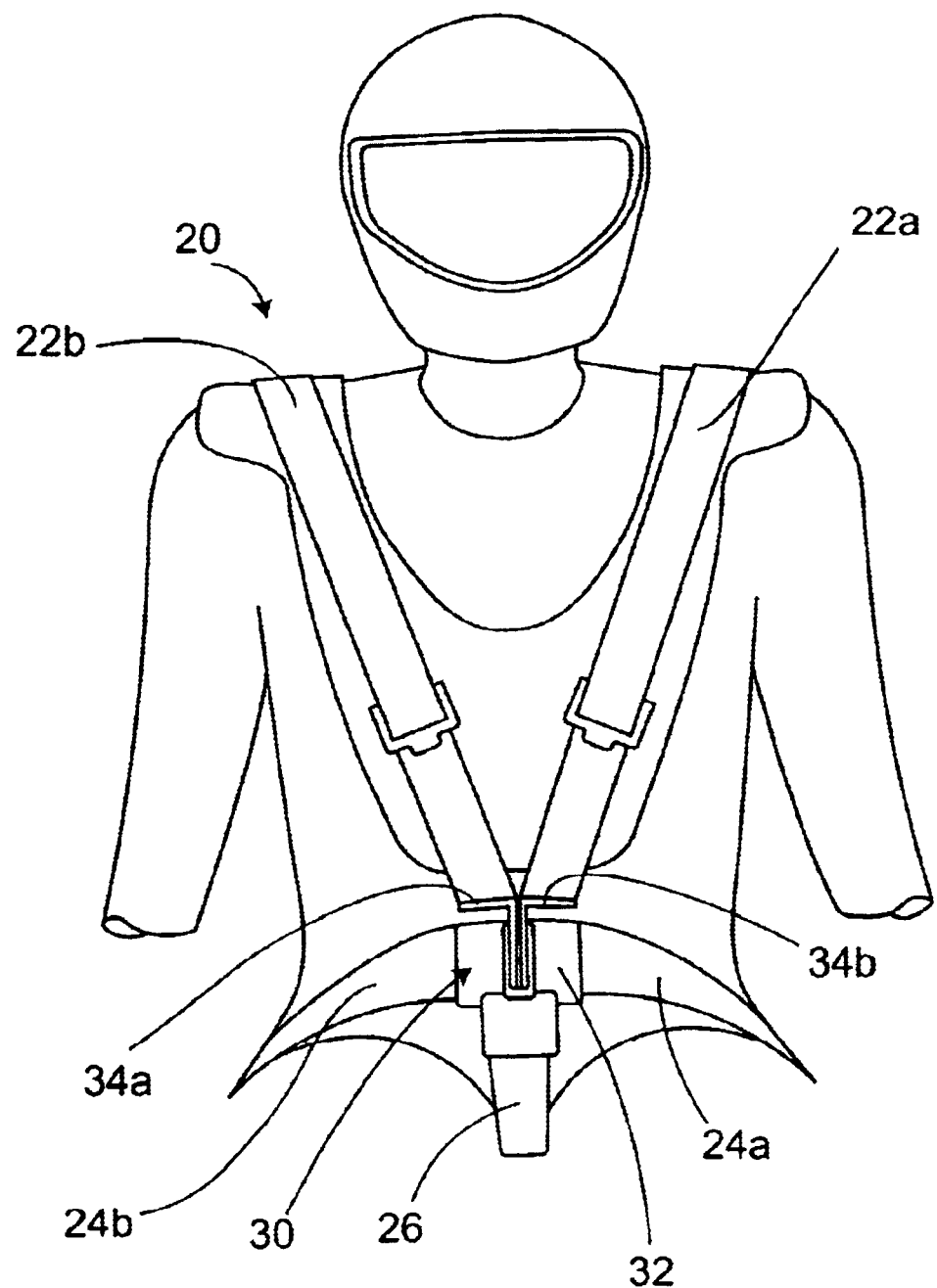
FIG. 1 diagrammatically represents a prior art five-point racing car seat belt system.
Figure 6A:
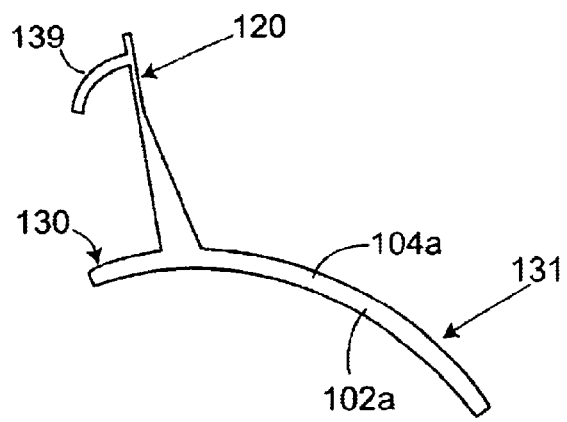
FIG. 6A is another embodiment of the invention.
Figure 2:
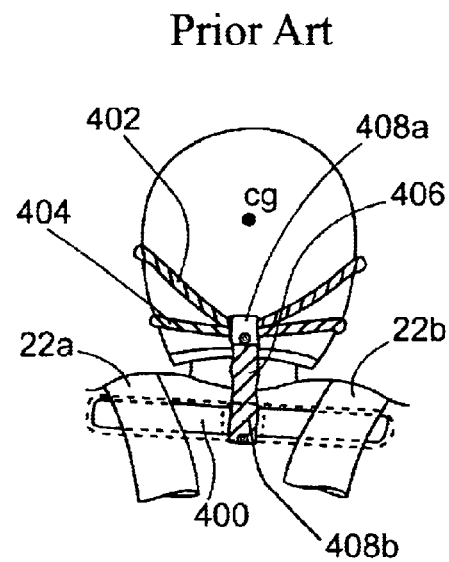
FIGS. 2 and 3 illustrate a prior art restraint system.

The present invention also uses a bar 400 and the tether 406, which are shown in FIG. 7. The tether 406 extends from the bar 400 slidingly across the tether guide 124 to the helmet. The tether 406 is received within the groove or support surface 136 in the vertical support tower 120. If the curved web or tether guide support surface 139 of FIG. 6A is used the tether 406 is supported by surface 139, which transitions to surface 136. As can be seen from FIG. 7, the tether 406 extends generally horizontally from the tether guide 124 to its helmet connection point 140 such that during normal driving situations, the connection point 140 and the web guide 124 (and more particularly from the grove 136 and/or surface 139) are in or close to the same plane that is, a place which also contains the center of gravity of the head-helmet (with the head in an erect, straight-ahead position).

Figure 3:
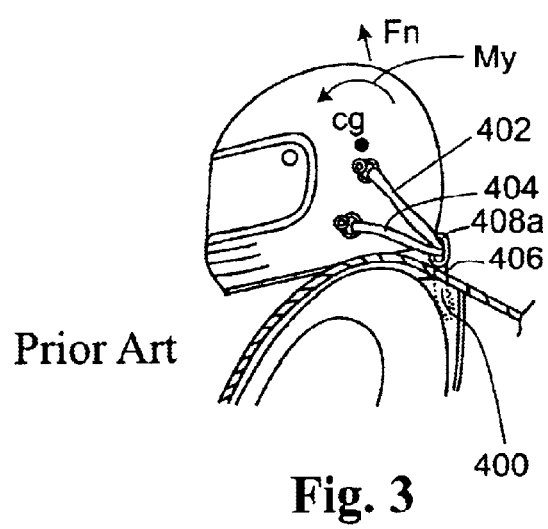

One of the benefits of the present invention in comparison to that shown in FIG. 3 is that as the head begins to move or rotate forward in the vehicle, the neck moment, $M_y$, neck axial force, $F_N$, are significantly reduced in comparison to the prior art system. Additionally, since the restraint forces of tethers 402 and 406 act on the helmet through a horizontal plane passing through the head center of gravity, neck shear force is also reduced. Additionally, as can be seen, the bar 400 bridges (is positioned atop) the rear portion 130 of each side 102*a* and 102*b* with a respective shoulder belt atop opposing ends of the bar 400. During an accident, the bar 400 will stay in place as the respective shoulder belt presses the bar on the sides 102*a* and 102*b* of the yoke 100.

As mentioned above, one of the prior art solutions suggested that the tethers, such as 402–406, be made of an elastic material. As is known in the art, seat belt and/or air bag systems have proposed the use of various tethers and often these tethers are made of conventional seat belt webbing. Reference is made to FIG. 9, which shows a force vs. relative elongation curve of a typical seat belt (see curve 901). The relative elongation of a typical seat belt depends on its construction, and will vary from about 6 to 12 percent, however, once the belt is significantly stretched beyond its elastic limit (which will occur after the belt is stretched a determinable extension), the subsequent elongation of the webbing decreases. It is suggested that one of the reasons for this is plastic deformation of the seat belt fibers.

We have found it to be desirable to utilize a tether material having a variable elongation characteristic as shown in FIG. 9. As mentioned above, one of the prior art solutions is to use a yieldable material wherein the yield is determined by the material characteristics and the weave density. However, once the material's elastic limit has been reached, the desired energy absorbing characteristics of the webbing are destroyed or significantly reduced. The seat belt webbing of FIG. 9 has: a) a variable relative elongation (see curve 902 of FIG. 9), and b) is characterized by having a memory.

One such webbing is discussed in U.S. Pat. No. 5,830, 811, which is incorporated herein by reference. FIG. 9 also shows the force elongation characteristic of conventional seat belt webbing (see curve 901). Consequently, during an accident the webbing will stretch. However, as soon as the webbing is no longer subjected to elongating crash forces, the webbing relatively quickly returns to its pre-stressed condition. Consequently, in a situation in which the vehicle is subjected to multiple crash hazards, the tether will deform, absorbing part of the crash energy as the occupant's head moves about the passenger compartment during the crash event. When the stress on the webbing is relaxed, the webbing will quickly return to its unstressed length so if the vehicle is involved in a continuing or subsequent accident, the webbing will elastically react as it did in the first instance.

Many changes and modifications in the above-described embodiment of the invention can, of course, be carried out without departing from the scope thereof. Accordingly, that scope is intended to be limited only by the scope of the appended claims.

What is claimed is:

1. An occupant helmet protection system usable with an occupant helmet and a seat belt system, the seat belt system of the type including at least a first and a second shoulder belt each of which when worn is positioned to lie across a respective shoulder of an occupant, the helmet occupant protection system comprising:

a tether having a first end adapted to be operatively connected to the helmet at a point generally in alignment with an effective center of gravity of the combined helmet and the occupant's head, the tether including a center portion and second end connected to a tether anchor point;

first means exchangeable with said belts for orienting the tether, as it extends from the helmet in alignment with or above a horizontal plane which extends through the helmet generally at the location of the combined center of gravity with the occupant's head in an approximate vertical position.

2. The system as defined in claim 1 wherein the first means includes a frame member (100) loosely supportable upon the shoulders of the occupant and including an elevated portion (120), a top of the elevated portion functioning as a tether guide means for changing the direction of the tether and providing a low friction surface across which the tether can slide.

3. The system as defined in claim 1 wherein the anchor point is located below the top of the elevated portion.

4. The system as defined in claim 2 wherein the frame member includes a pair of arcuate side wings (102*a,b*), each wing laterally spaced from the other, the wings mountable on the shoulders of the occupant.

5. The system as defined in claim 4 wherein the elevated portion is positioned in between the side wings.

6. The system as defined in claim 5 wherein the elevated portion includes a bottom edge which is relatively elevated so that with the frame member upon the shoulders of the occupant, the bottom edge is spaced from the occupant.

7. The system as defined in claim 2 wherein the top of the elevated portion includes second means for preventing the tether from moving off the top of the elevated portion.

8. The system as defined in claim 7 includes a support surface (136) atop the elevated portion.

9. The system as defined in claim 4 wherein the anchor point includes a bar secured to the second end of the tether and wherein the bar is locatable below each respective wing and above each respective shoulder of the occupant.

10. The system as defined in claim 1 wherein the tether has a variable elongation characteristic and a mechanism memory.

11. An occupant helmet protection system usable with an occupant helmet and a seat belt system, the seat belt system of the type including at least a first and a second shoulder belt, each of which when worn is positioned to lie across a respective shoulder of an occupant, the helmet occupant protection system comprising:

an energy absorbing, flexible tether having a first end operatively adapted to be connected to the helmet in alignment with an effective center of gravity of the combined helmet and the occupant's head, the tether including a second end connected to a tether anchor point;

a frame member loosely supported about the shoulders of the occupant and including a center or tower portion (120), the center or tower portion having a tether guide means for changing the direction of the tether and providing a low friction surface for the tether, the tether guide means located in alignment with or slightly above a first plane which passes through the effective center of gravity of the head-helmet combination and the tether-helmet anchor point, the tether passing about and not connected to the frame member.

12. The system as defined in claim 11 wherein the frame member includes: first and second side members each of which includes an undersurface sized and shaped to rest and fit about a corresponding shoulder of the occupant, a center or tower member, connected to the first and second side members, the center or tower member, extending up from the first and second side members, an opposing end of the tower portion includes the tether guide means.

13. The system as defined in claim 12 wherein the tether guide means includes one of a groove or support surface located in alignment with or above a first plane including the effective center of gravity and the tether anchor point.

14. The system as defined in claim 13 wherein the tether anchor point is secured to a bar that is placed between the back of the occupant and the shoulder belts.

15. An occupant helmet protection system usable with an occupant helmet and a seat belt system, the seat belt system of the type including at least a first and a second shoulder belt each of which when worn is positioned to lie across a respective shoulder of an occupant, the helmet occupant protection system comprising:

a flexible tether having a first end operatively connected to a first anchor point proximate the rear of the helmet, the tether including a medial portion and a second end connectable to a second anchor point;

a frame member removably supportable upon the shoulders of the occupant and including an elevated member (120), the elevated member having a guide surface which elevates the medial portion of the tether to lie in or close to a first plane which passes through the effective center of gravity of the head-helmet combination and the tether-helmet anchor point.

16. The system as defined in claim 15 wherein the frame member includes: first and second side members each of which includes an undersurface sized and shaped to rest and fit about a corresponding shoulder of the occupant, the elevated member connected to the first and second side members and extending up from the first and second side members.

17. The system as defined in claim 15 wherein a lower portion of the elevated member is positioned off set from an upper portion of the spine of the occupant.

18. The system as defined in claim 15 wherein the medial portion of the tether passes about the frame member.

19. The system as defined in claim 18 wherein the second anchor point of the tether is anchored to a component other than the frame member.

20. The system as defined in claim 15 wherein the second anchor point is secured to a bar locatable between the frame member and the shoulder belts.

21. The system as defined in claim 15 wherein the tether is made of an expandable material having a mechanical memory.

\* \* \* \* \*